May 27, 1924.
J. S. FINLEY
1,495,225
HUB ATTACHMENT
Filed May 9, 1923
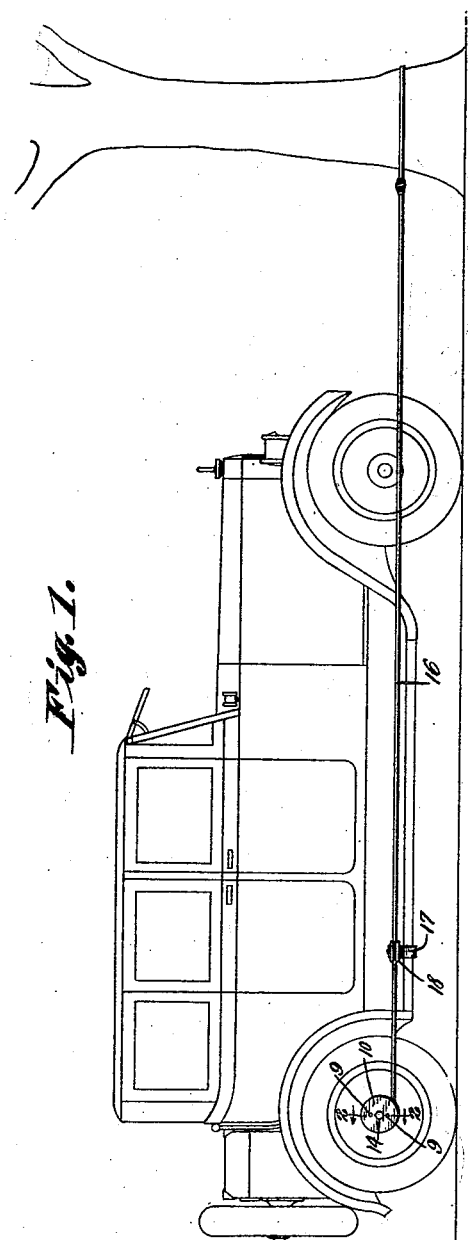
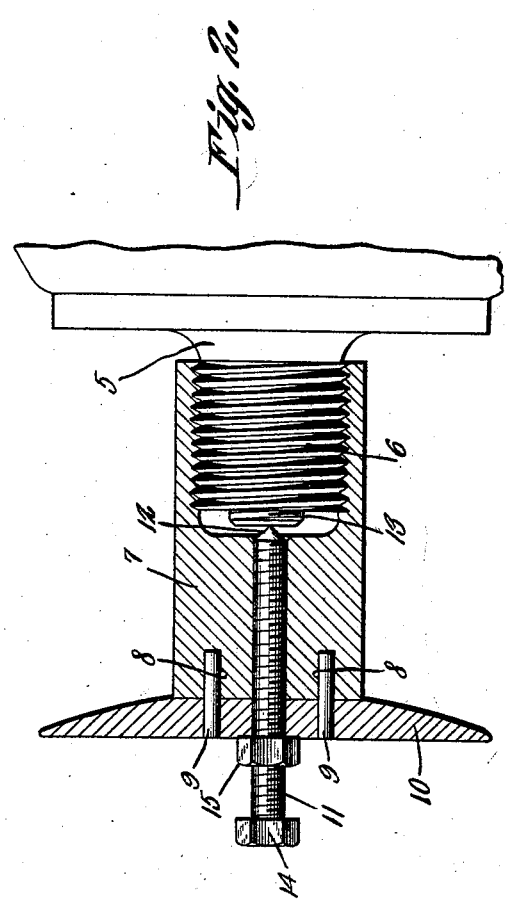
J. S. Finley,
Inventor.
By C. A. Snow & Co.
Attorney.

Patented May 27, 1924.

1,495,225

UNITED STATES PATENT OFFICE.

JOE S. FINLEY, OF HAYNESVILLE, LOUISIANA.

HUB ATTACHMENT.

Application filed May 9, 1923. Serial No. 637,855.

*To all whom it may concern:*

Be it known that I, Joe S. Finley, a citizen of the United States, residing at Haynesville, in the county of Claiborne and State of Louisiana, have invented a new and useful Hub Attachment, of which the following is a specification.

This invention relates to hub attachments and more particularly to a device especially designed for hubs of wheels used in connection with motor vehicles.

The primary object of the invention is to provide a hub which will replace the usual hub cap and at the same time be employed as a windlass for winding a cable or other flexible member thereon, to direct a pull to the rear end of a motor vehicle to assist in moving the vehicle from muddy road surfaces.

Another object of the invention is to provide a device of this character which may be locked in position on the hub of a wheel so that movement of the attachment with respect to the wheel will be restricted when the cable is being wound thereon.

A still further object of the invention is to provide an attachment of this character wherein the flange is removable permitting the cable to be removed with facility, due consideration being given to the strength and durability of the attachment.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a view in elevation disclosing a motor vehicle equipped with an attachment constructed in accordance with the invention.

Figure 2 is a sectional view taken on line 2—2 of Figure 1.

Referring to the drawing in detail, the reference character 5 designates the hub of a vehicle wheel which is supplied with the usual threads 6 to accommodate the usual hub cap which in the present showing, has been removed and replaced by the attachment forming the essence of the present invention.

The attachment includes a body portion 7 in which is formed an opening at one end thereof, the wall of which opening being threaded to cooperate with the threads 6 of the hub 5, so that the device may be readily positioned thereon.

Formed in the outer end of the body 7 are spaced openings 8 that accommodate the pins 9 that are carried by the flange 10, which flange guards the outer end of the body 7 to prevent the cable from sliding therefrom, and at the same time guide the cable to the body portion when the cable is being wound thereon. Thus it will be seen that rotary movement of the flange 10 with respect to the body 7 is absolutely prevented.

In order that the body portion 7 may be securely locked to the hub of a wheel, the body portion as well as the flange is formed with a threaded bore to accommodate the threaded bolt 11 that is formed with a tapered inner extremity 12 designed to engage the outer end of the axle 13 on which the wheel, of which the hub 5 forms a part is mounted.

The bolt is formed with a head 14 to accommodate a suitable wrench to facilitate the proper positioning of the bolt 11, the action of the bolt 11 being to set up a binding action between the threads 6 and the threads of the body 7 to securely lock the attachment to the hub.

To further lock the attachment against movement, a lock nut 15 is provided, which is positioned on the bolt 11 and is rotated to engage the outer surface of the flange 10 and lock the bolt 11 against movement.

The cable which is employed in connection with the attachment is indicated at 16 and may be secured to the body 7 in any suitable and well known manner, it being contemplated to anchor or secure the opposite end of the cable to a tree or similar anchorage so that when power is applied to the rear axle of the vehicle, and wheel supporting the attachment, the cable will be wound on the body portion 7 exerting a pull on the rear end of the vehicle to move the vehicle towards the anchorage.

In order that the pull exerted on the rear end of the vehicle will be direct, to insure against lateral movement of the vehicle, an arm 17 is provided which may be clamped to the running board of a vehicle, the arm supported in a suitable pulley indicated at 18 which pulley is formed with a groove to accommodate the cable 16 and hold the same against lateral movement.

In view of the foregoing detail description it is believed that a further detail of the construction is unnecessary.

What is claimed as new is:—

1. An attachment for hubs including a body portion having a threaded opening to be positioned on the threaded end of a hub, said body portion having openings in the outer end thereof, a removable flange having pins adapted to be positioned in the openings to restrict movement of the flange with respect to the body portion, and means extending through the flange and body portion and engaging the axle on which the hub is positioned to lock the body portion to the hub.

2. An attachment for hubs including a body portion, having a threaded opening to be positioned over the threaded end of a hub, a flange on the body portion, said body portion having a threaded bore, and a threaded member extending through the threaded bore and adapted to engage the end of the axle on which the hub is positioned, to secure the body portion to the hub.

In testimony that I claim the foregoing as my own, I have hereto affixed my signature in the presence of two witnesses.

JOE S. FINLEY.

Witnesses:
P. P. BRIDGES,
C. S. FINLEY.